(12) United States Patent
Mullen et al.

(10) Patent No.: US 12,449,029 B2
(45) Date of Patent: Oct. 21, 2025

(54) BEARING RETENTION SYSTEM

(71) Applicant: Lockheed Martin Corporation, Bethesda, MD (US)

(72) Inventors: Michael F. Mullen, Cheshire, CT (US); Jimmy Yeung, Woodside, NY (US); Noah McCreight, Brooklyn, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 131 days.

(21) Appl. No.: 18/343,230

(22) Filed: Jun. 28, 2023

(65) Prior Publication Data

US 2025/0003478 A1    Jan. 2, 2025

(51) Int. Cl.
*F16H 57/021* (2012.01)
*B64C 27/12* (2006.01)
*F16C 35/063* (2006.01)
*F16H 57/02* (2012.01)

(52) U.S. Cl.
CPC ........... *F16H 57/021* (2013.01); *B64C 27/12* (2013.01); *F16C 35/063* (2013.01); *F16C 2326/43* (2013.01); *F16H 2057/02043* (2013.01)

(58) Field of Classification Search
CPC ...... F16C 35/06; F16C 35/061; F16C 35/063; F16C 2326/43
See application file for complete search history.

(56) References Cited

U.S. PATENT DOCUMENTS

| | | |
|---|---|---|
| 3,912,412 A | 10/1975 | Struttman |
| 3,942,387 A * | 3/1976 | Stone .................... F16H 57/038 |
| | | 464/178 |
| 5,660,484 A | 8/1997 | Peel |
| 5,746,517 A | 5/1998 | Durham et al. |
| 5,971,621 A | 10/1999 | Oyafuso et al. |
| 9,133,926 B2 | 9/2015 | Hayes et al. |
| 11,505,239 B2 | 11/2022 | Suzuki et al. |
| 2006/0222280 A1 * | 10/2006 | Harada ................... F16B 21/18 |
| | | 384/561 |

FOREIGN PATENT DOCUMENTS

| | | | |
|---|---|---|---|
| DE | 102019207255 A1 | 8/1982 | |
| DE | 19845671 C1 * | 4/2000 | ............ F16C 19/386 |
| EP | 1457673 B1 | 12/2009 | |
| FR | 2734874 A1 | 12/1996 | |
| GB | 2012011 B | 11/2020 | |
| JP | 7196516 B2 | 12/2022 | |
| WO | WO-2023046515 A1 * | 3/2023 | .......... F16C 33/6659 |

OTHER PUBLICATIONS

Translation of DE19845671 obtained Jan. 2, 2025.*

* cited by examiner

*Primary Examiner* — James Pilkington
(74) *Attorney, Agent, or Firm* — Michael Best & Friedrich LLP

(57) ABSTRACT

A gear box includes a housing, a shaft that is driven by the gear, the shaft including a recess, a bearing mounted between the shaft and the housing to support the shaft for rotation with respect to the housing about a rotation axis, and a ring assembly for axially securing the bearing to the shaft. The ring assembly surrounds the shaft and is seated in the recess. The recess has a retaining surface including a conical surface extending at an angle to the rotation axis, a curved surface, and a transition surface extending between the conical surface and the curved surface, the transition surface extending generally parallel to the rotation axis.

16 Claims, 4 Drawing Sheets

BEARING RETENTION SYSTEM

FIELD OF INVENTION

Embodiments described herein relate to shaft bearings, and in particular shaft bearings positioned on shafts subject to high loads.

BACKGROUND

Aircrafts, and specifically vertical take-off and landing (VTOL) aircrafts utilize rotors to provide lift and thrust. A VTOL may include one or more rotors coupled to a main rotor shaft. The main rotor shaft is driven to rotate and is supported for rotation within a gearbox of the aircraft by one or more bearings.

SUMMARY

Embodiments described herein provide a gear box including a housing, a shaft that is driven by the gear, the shaft including a recess, a bearing mounted between the shaft and the housing to support the shaft for rotation with respect to the housing about a rotation axis, and a ring assembly for axially securing the bearing to the shaft. The ring assembly surrounds the shaft and is seated in the recess. The recess has a retaining surface including a conical surface extending at an angle to the rotation axis, a curved surface, and a transition surface extending between the conical surface and the curved surface, the transition surface extending generally parallel to the rotation axis.

Embodiments described herein provide a bearing retention system for a gear box. The gear box includes a housing and a shaft at least partially positioned within the housing. The system includes a bearing mounted between the shaft and the housing to support the shaft for rotation relative to the housing about a rotation axis. The bearing is adjacent a shoulder formed in the shaft. The bearing includes an inner race surrounding the shaft, an outer race coupled to the housing, and a plurality of rollers positioned between the inner race and the outer race to allow rotation of the outer race with respect to the inner race. A split ring surrounds the shaft and is selectively engageable within a recess formed in the shaft. The recess and the shoulder are on axially opposite sides of the bearing. A locking ring surrounds the split ring and biases the split ring into the recess. The bearing is axially secured with respect to the shaft between the shoulder and the recess.

Embodiments described herein provide an aircraft includes a main body extending between a nose and a tail, a shaft extending between a first end and a second end along an axis, a rotor assembly mounted on the first end of the shaft, and a gear box configured to drive the shaft to rotate the rotor assembly, the gear box including a housing. A bearing is mounted between the shaft and the housing to support the shaft for rotation with respect to the housing about the axis. The shaft includes a shoulder and a recess and the bearing rests against the shoulder. A ring assembly for axially securing the bearing to the shaft includes a split ring at least partially seated within the recess, and a locking ring surrounding the split ring to bias the split ring into the recess.

Other aspects will become apparent by consideration of the detailed description and accompanying drawings.

SUPPORTIVE DESCRIPTION OF THE DRAWINGS

DETAILED DESCRIPTION

Before any embodiments are explained in detail, it is to be understood that the embodiments described herein are provided as examples and the details of construction and the arrangement of the components described herein or illustrated in the accompanying drawings should not be considered limiting. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting, and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, and the like.

Figure 1:
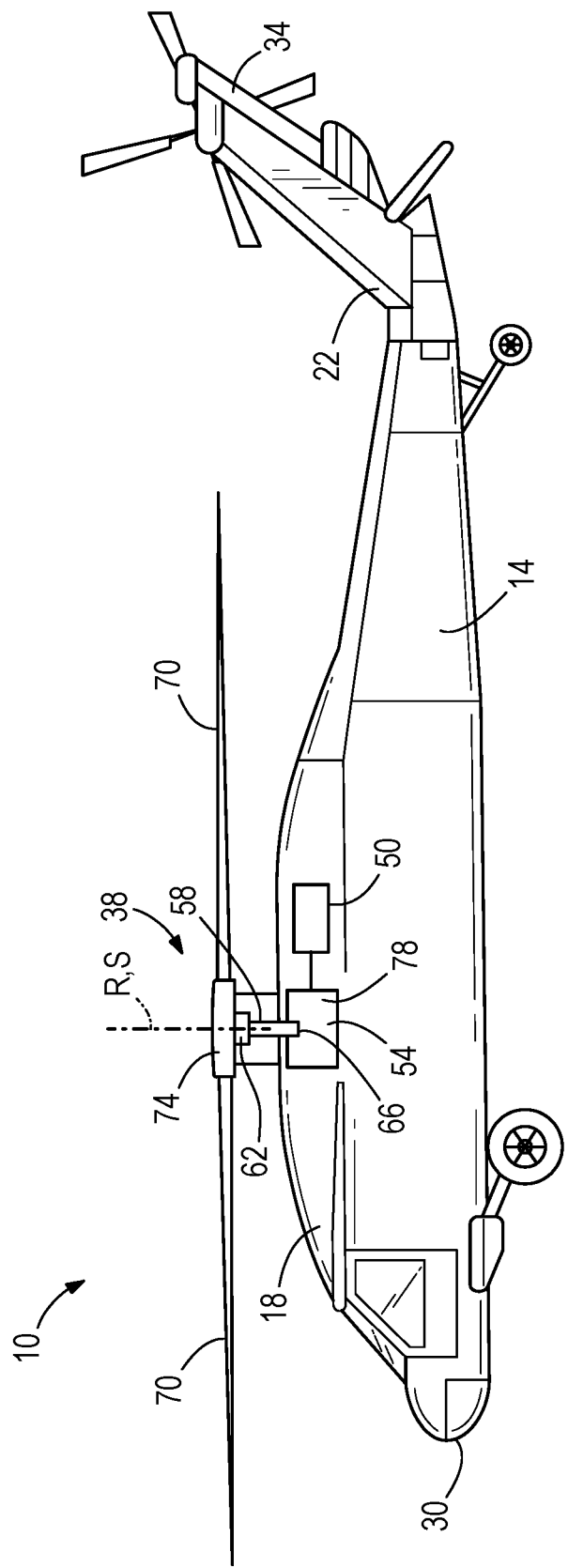
FIG. 1 illustrates an aircraft according to an exemplary embodiment.

FIG. 1 illustrates a vertical take-off and landing (VTOL) aircraft 10 or rotary wing aircraft according to some embodiments. The aircraft 10 includes a main body 14 including an airframe 18 and an empennage 22. The airframe 18 extends between a nose 30 and a tail 34. The aircraft 10 includes a rotor assembly 38 coupled to the main body 14 between the nose 30 and the tail 34. In the illustrated embodiment, the aircraft 10 is a single rotor helicopter and includes a main rotor assembly 38 that rotates about a rotational axis R. In other embodiments, the aircraft may be of a different type, for example, dual rotor assembly helicopters, tandem rotor helicopters including offset rotor assemblies, tandem intermeshing rotor helicopters including overlapping rotor assemblies, coaxial helicopters including a plurality of rotary wings aligned along a common axis, and the like, and the rotor assembly 38 may be the rotor assembly of the respective aircraft. The main body 14 defines a cockpit in the airframe 18 having one or more seats for flight crew and optional passengers. The main rotor assembly 38 is driven by a power source 50, such as, for example, one or more motors via a main rotor gear box 54. The one or more motors can include an electric motor, a piston engine, a gas turbine, or other device for providing motion.

The main rotor assembly 38 is mounted on a main shaft 58 (also referred to herein as a shaft or a main rotor shaft) extending along a shaft axis S between a first end 62 and a second end 66. When assembled, the shaft axis S is coaxial with the rotational axis R. The main rotor assembly 38 includes a plurality of blades 70 coupled to a hub 74. The hub 74 is coupled to the first end 62 of the shaft 58. The second end 66 of the shaft 58 is positioned within the airframe 18. Rotation of the shaft 58 rotates the blades 70 about the rotational axis R generating lift. The shaft 58 may be rotated by a gear train 78 positioned within the gear box 54.

In some operational conditions, wind or extreme flight conditions may create a bending moment or a negative thrust condition within the main shaft 58. For example, negative thrust may occur in conditions when the aircraft is in a state of autorotation, when the aircraft performs a pushover maneuver, when the aircraft is grounded in high wind conditions, or when the aircraft is grounded and the droop stops are pounded or otherwise impacted. If during these conditions, the shaft 58 is supported via components press-fit onto the shaft 58, the bending moment or negative thrust condition may cause the shaft 58 to axially displace relative to the press-fit components (e.g., bearings). This displacement may be known as "self-disassembly" of a press-fit or interference fit connection. Axial displacement of the shaft 58 may cause additional wear or damage to surrounding components. For example, in some cases the shaft 58 may displace inwardly along the rotational axis R toward the bottom of the aircraft 10, and the second end 66 of the shaft 58 may contact and/or interfere with other components adjacent the second end 66 of the shaft 58, such as the gear train 78 or an oil sump.

Figure 2:
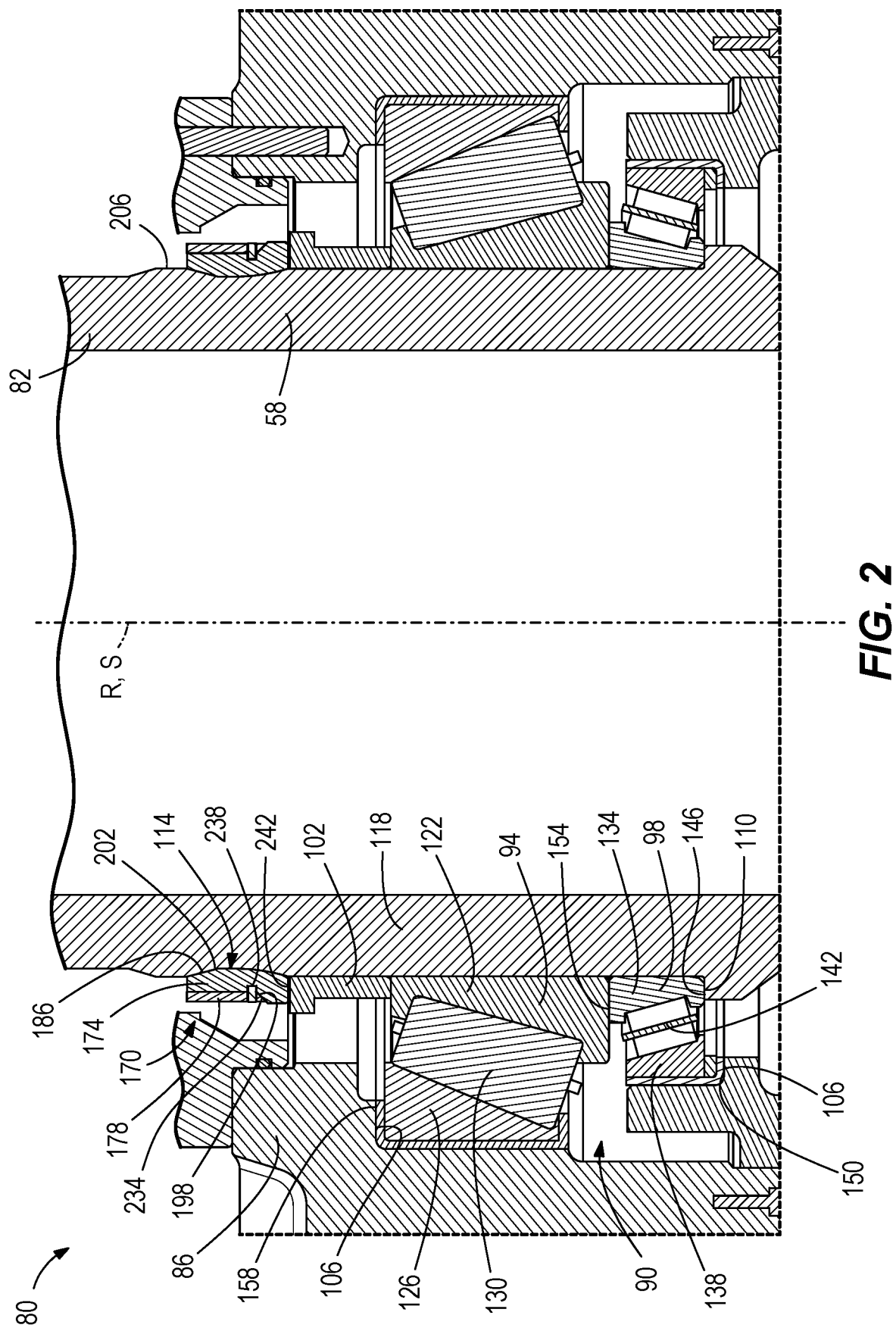
FIG. 2 is a sectional view of one embodiment of a bearing retention system used in a gear box of the aircraft of FIG. 1.

With reference to FIG. 2, to prevent axial displacement of the main shaft 58, a bearing retention system 80 is used. While the bearing retention system 80 is described in use in the main shaft 58 of the aircraft 10, the bearing retention system 80 may also be usable in other parts of the airplane, for example the tail rotor shaft. The bearing retention system 80 is also widely applicable in other situations having a rotating shaft subject to high loads, for example, propellers for planes or boats, drills in oil rigs, or wind turbines.

FIG. 2 illustrates a portion 82 of the shaft 58 within the airframe 18. The portion 82 of the shaft 58 may extend within a housing 86 of the main rotor gear box 54. In the following description, the housing 86 is described as part of the main rotor gear box 54, however, in other embodiments the housing 86 may be a separate housing within the airframe 18 that may be specific to a support assembly or may contain other components.

A bearing assembly 90 is positioned around the shaft 58 to support the shaft 58 within the housing 86. In the illustrated embodiment, the bearing 90 includes a first bearing 94, a second bearing 98, and a spacer sleeve 102. In other embodiments, the spacer sleeve 102 may be omitted, the bearing assembly 90 may include a single bearing, or the bearing assembly 90 may have an entirely different configuration of bearings and spacers. The housing 86 includes one or more ledges 106 that support the bearing assembly 90 to prevent axial displacement of the bearing assembly 90 with respect to the housing 86.

The portion 82 of the shaft 58 within the housing 86 includes a shoulder 110 and a recess 114. The shoulder 110 and recess 114 are axially spaced along the shaft axis S. The shaft 58 defines a support portion 118 formed between the shoulder 110 and the recess 114. The bearing assembly 90 is positioned around the shaft 58 adjacent the support portion 118. When assembled, the recess 114 and the shoulder 110 are on opposite ends of the bearing assembly 90.

Specifically, in the illustrated embodiment, the first bearing 94 includes an inner race 122, an outer race 126, and a plurality of rollers 130 positioned between the inner race 122 and outer race 126 to allow rotation therebetween. The second bearing 98 similarly includes an inner race 134, an outer race 138, and a plurality of rollers 142 positioned between the two races 134, 138 to allow rotation therebetween. In other embodiments other types of bearings may be used.

In the illustrated embodiment, the second bearing 98 is press-fit onto the support portion 118 of the shaft 58 and is positioned such that a bottom edge 146 of the inner race 134 abuts or rests on the shoulder 110 formed in the shaft 58. A bottom edge 150 of the outer race 138 is positioned adjacent one of the ledges 106 formed in the housing 86 so that the second bearing 98 is supported with respect to the housing 86. The outer race 138 may include multiple components, including spacers, and may be axially offset from the inner race to best support the shaft 58 relative to the housing 86. The ledge 106 prevents the bearing assembly 90 from axially displacing in a first direction (i.e., downward or toward the gear box 54) along the shaft axis S relative to the housing 86 and the shoulder 110 prevents the bearing assembly 90 from axially displacing in the first direction along the shaft axis S relative to the shaft 58.

The first bearing 94 is also press-fit onto the support portion 118 of the shaft 58 such that a bottom edge 154 of the inner race 122 abuts the second bearing 98. The outer race 126 of the first bearing 94 is positioned such that an upper edge 158 of the outer race 126 contacts one of the ledges 106 formed in the housing 86. The ledge 106 may prevent the bearing assembly 90 from axially displacing in a second direction (i.e., upward or away from the gear box 54) along the shaft axis S relative to the housing 86. The spacer sleeve 102 is also be press-fit onto the shaft 58 adjacent the inner race 122 of the first bearing 94. In the illustrated embodiment, the bearing assembly 90 extends along the entire support portion 118 of the shaft 58. A ring assembly 170 is coupled to the shaft 58 above the support portion 118 to selectively engage with the recess 114.

Figure 3:
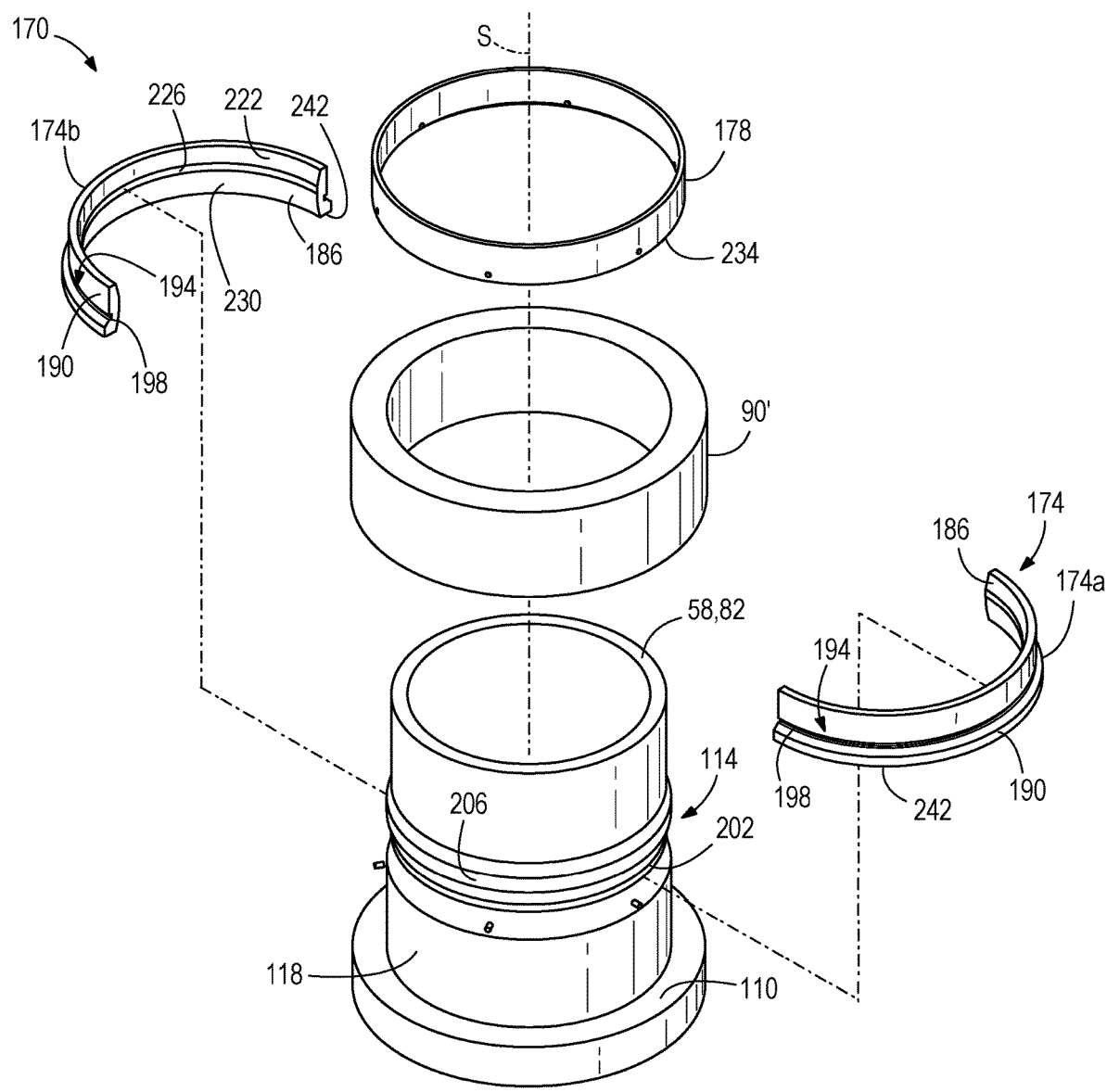
FIG. 3 is an exploded view of the bearing retention system of FIG. 2.

FIG. 3 illustrates an exploded view of the bearing retention system 80 including the ring assembly 170, the bearing assembly 90 (represented schematically by block 90'), and the portion 82 of the shaft 58. The ring assembly 170 includes a split ring 174 and an outer ring 178 (also referred to herein as locking ring). In the illustrated embodiment, the split ring 174 is formed of two halves 174a, 174b separated by two splits. In other embodiments, the split ring 174 may be a unitary piece with a singular split. In still other embodiments, the split ring 174 may be formed of more than two pieces with the corresponding number of splits. The split(s) allows the split ring 174 to bias inwardly to engage the recess 114. Specifically, the split ring 174 includes an inner surface 186 with a profile that is inverse to a profile of the recess 114 (discussed in further detail below). The split ring 174 also includes an outer surface 190 having receiving area 194 and a lip 198. In the illustrated embodiment the lip 198 is slanted with respect to the shaft axis S.

Figure 4:
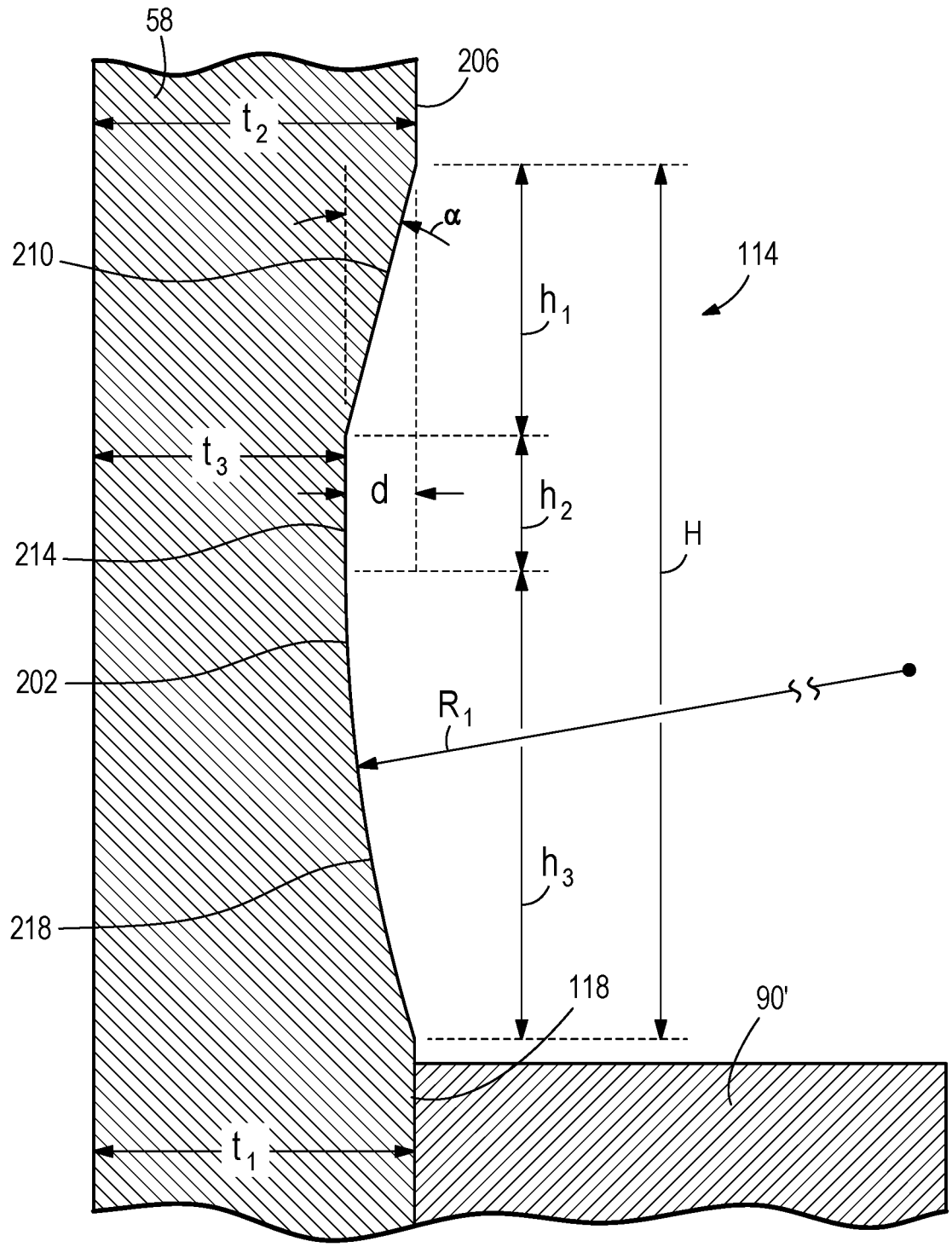
FIG. 4 is a detail view of a recess positioned on a main rotor shaft of the aircraft of FIG. 1.

With reference to FIGS. 2 and 4, the recess 114 on the shaft 58 is shown in more detail. The recess 114 extends along the shaft axis S to a height H and includes a retaining surface 202. The shaft 58 has a first outer diameter measured on the support portion 118. An upper portion 206 of the shaft 58, positioned above the recess 114, has a second outer diameter. In some embodiments the second outer diameter of the upper portion 206 is the same as the first outer diameter of the support portion 118. In other embodiments, the second outer diameter of the upper portion 206 is smaller than the first outer diameter of the support portion 118. The recess 114 extends from the outer diameter to a depth d. In one exemplary application, the depth may be between 2.92 millimeters (0.115 inches) and 3.68 millimeters (0.145 inches), and more specifically may be 3.3 millimeters (0.13 inches). In other applications, the depth may vary based on the size of the loads applied to the shaft 58, the material and fracture properties of the shaft, and other factors. Thus, any dimensions given in reference to the exemplary application are not intended to limit the possible applications.

In the illustrated embodiment, the shaft 58 is hollow and therefore has a thickness t1 at the support portion 118 and a thickness t2 at the upper portion 206. In the illustrated embodiment, the thicknesst1 is equal to the thickness t2, however, in some embodiments the thickness t2 may be different than the thickness t1. In embodiments where the shaft 58 is solid the "thickness" may refer to a measurement from the central axis to the outer surface (i.e., the radius). Regardless of the relative thicknesses t1, t2, the diameter of the upper portion 206 is equal to or less than the diameter of the support portion 118, so the bearing assembly 90 may be moved down over the upper portion 206 and be press fit onto the support portion 118 against the shoulder 110. Similarly, the recess 114 is set in from the outer diameter of the support portion 118 so that the bearing retention system 80 does not interfere with installation of the bearing assembly 90.

The retaining surface 202 includes a conical surface 210, a transition surface 214, and a curved surface 218. The conical surface 210 is positioned adjacent the upper portion 206 of the shaft 58 and extends from the outer diameter to the depth d. The conical surface 210 extends on a straight line at an angle α. The angle α is a relatively shallow acute angle measured relative to the shaft axis S. The conical surface 210 extends along the shaft axis S to a first height h1. The conical surface 210 is angled with respect to the shaft axis to form a stop capable of reacting axial forces to prevent axial movement upward along the shaft 58. The first height h1 should be sufficiently long so that axial force applied to the conical surface 210 creates a stress profile within the shaft 58 that is within the acceptable range allowed by the material. The transition surface 214 of the retaining surface 202 extends generally parallel to the shaft axis S. The transition surface 214 extends to a second height h2 along the shaft axis S. In the illustrated embodiment, the shaft 58 has a thickness t3 at the transition surface 214. The thickness t3 of the shaft 58 in the recess 114 is less than the thicknesses t1, t2, and is generally equal to the thickness t2 minus the depth d. In other words, the transition surface 214 is recessed from the outer diameter by the depth d.

The curved surface 218 of the retaining surface 202 extends from the transition surface 214 at the depth d back to the outer diameter of the support portion 118. In the illustrated embodiment, the profile of the curved surface 218 is a segment of a circle and has a constant radius r1. In other embodiments, more complex curves may be used and the curved surface 218 may have multiple sections of varying radii. The curved surface 218 extends along the shaft axis S to a third height h3. Small fillets may be positioned between the different surfaces. Specifically, a small fillet may be positioned between the conical surface 210 and the transition surface 214, a small fillet may be positioned between the conical surface 210 and the upper portion 206, and another small fillet may be positioned between the curved surface 218 and the support portion 118. The transition surface 214 extends up from the curved surface 218 following the tangent of the curve.

In the exemplary application, the angle a may be between about 10 degrees and 20 degrees relative to the shaft axis S. More specifically, the angle α may be about 14.6 degrees. The first height h1 may be between 3.1 millimeters (0.12 inches) and 23 millimeters (0.92 inches). Specifically, the first height h1 may be approximately 13 millimeters (0.52 inches). The second height h2 may be between 3.8 millimeters (0.15 inches) and 8.9 millimeters (0.35 inches). The second height h2 may be 6.4 millimeters (0.25 inches). The radius r1 may be between 69.9 millimeters (2.75 inches) and 85.6 millimeters (3.25 inches). The radius r1 may be approximately 76 millimeters (3 inches). The third height h3 may be between 19 millimeters (0.75 inches) and 24 millimeters (0.95 inches). The third height h3 may be approximately 22 millimeters (0.85 inches). The small transition fillets may have a radius of approximately 0.762 millimeters (0.030 inches).

As seen in FIG. 4, in the illustrated embodiment, the third height h3 of the curved surface 218 is larger than the first height h1 of the conical surface 210 and larger than the second height h2 of the transition surface 214. The first height h1 is larger than the second height h2.

Referring once again to FIG. 2, once the bearing assembly 90 has been installed on the shaft 58, the ring assembly 170 is coupled to the shaft 58 to engage the recess 114. The halves of the split ring 174 are positioned on either side of the shaft 58 adjacent the recess 114. As mentioned above, and as seen in FIG. 3, the inner surface 186 of the split ring 174 has a profile inverse of the recess 114 profile and includes a ring conical surface 222 extending at an angle to the shaft axis S, a ring transition surface 226 extending parallel to the shaft axis S, and a ring curved surface 230 extending at a constant radius equal to the radius of the curved surface 218.

Referring back to FIG. 2, the split ring 174 is positioned so that the inner surface 186 is adjacent the retaining surface 202. The outer ring 178 is then moved downward along the shaft axis S to engage the halves 174a, 174b of the split ring 174, moving the halves radially inwardly toward the axis S. The outer ring 178 biases the split ring 174 into the recess 114 so that the inner surface 186 of the split ring 174 contacts the retaining surface 202 of the recess 114. The conical surfaces 210, 222 may cooperate to help guide and axially align the inner surface 186 and the retaining surface 202 as the split ring 174 moves into the recess 114. The outer ring 178 is positioned in the receiving area 194 of the outer surface 190 so that a bottom edge 234 of the outer ring 178 abuts the lip 198. A bottom edge 242 of the split ring 174 abuts the bearing assembly 90.

In the illustrated embodiment fasteners 238 are used to couple the outer ring 178 to the pieces of the split ring 174 to prevent unintentional disengagement of the split ring 174 from the recess 114. The fasteners 238 may be screws with a spherical ball tip that fits into a spherical dimple on the split ring 174. The fasteners 238 may be threaded and engage corresponding threads on the split ring 174 and optionally the outer ring 178. In some embodiments, pegs may simply be press-fit into corresponding apertures. In other embodiments, the outer ring 178 may be held on the split ring 174 by a press fit or by other coupling features, such as a cooperating detent and indent or groove and tang.

The ring assembly 170 is coupled to the main shaft 58, thereby axially securing the bearing assembly 90 to the main shaft 58. The bearing assembly 90 is prevented from moving in the first direction (axially downward along the shaft axis S) by the shoulder 110 formed in the shaft 58. The bearing assembly 90 is prevented from moving in the second direction (axially upward along the shaft axis S) by the ring assembly 170. Any upward axial movement applies an axial force on the ring assembly 170, which is reacted through the split ring 174 to the main shaft 58 by the engagement of the retaining surface 202 with the inner surface 186. More specifically, the axial force is reacted through the engagement of the conical surfaces 210, 222.

In some embodiments, the bearing retention system 80 can be retrofitted into the gear box 54. When a main shaft 58 having bearings 90 press fit on the shaft 58 is nearing the end of its fatigue life and is due for replacement, the shaft can be replaced with a main shaft 58 having a recess 114. The ring assembly 170 can then be coupled to (or seated in) the recess 114 to axially secure the bearing 90.

As discussed above, the shaft 58 is subject to high loading, including bending loads and negative thrust loads. Other bearing retainment systems that use a ring assembly may include a groove with a profile having abrupt changes in thickness as you travel along the shaft axis S. These profiles can cause points with high stress concentration which leads to cracking and failure when the shaft is fatigue loaded. The profile of the recess 114 allows for engagement with the ring assembly 170 to axially secure the bearing assembly 90 without decreasing the fatigue life of the shaft 58. Specifically, increasing the radius rl of the curved surface 218 decreases the impact of the recess 114 on the fatigue life of the shaft 58. Other bearing retainment systems may use threads to locate a nut to act as an axial stop. However, threads can similarly negatively affect the fatigue life of the main shaft 58. Thus, the proposed bearing retention system 80 improves retainment of the bearing 90 without decreasing the fatigue life of the shaft 58. Finally, some previous solutions would include adding a spacer braced against a portion of the housing to hold the bearing 90 against the shoulder 110 of the shaft 58. But these solutions add significant extra weight, which is undesirable in an aircraft. In contrast, the ring assembly 170 of the proposed design adds negligible weight to the overall weight of the aircraft 10.

Various features and advantages of the embodiments described herein are set forth in the following claims.

What is claimed is:

1. A gear box, the gear box comprising:
a housing;
a shaft that is driven by the gear box, the shaft including a recess;
a bearing mounted between the shaft and the housing to support the shaft for rotation with respect to the housing about a rotation axis; and
a ring assembly for axially securing the bearing to the shaft, the ring assembly surrounding the shaft and seated in the recess;
wherein the recess has a retaining surface including:
a conical surface extending at an angle to the rotation axis;
a curved surface that is curved relative to the rotation axis; and
a transition surface extending between the conical surface and the curved surface, the transition surface extending generally parallel to the rotation axis,
wherein the curved surface is larger than the transition surface.

2. The gear box of claim 1, wherein the angle is between 10 degrees and 20 degrees.

3. The gear box of claim 1, wherein the curved surface has a constant radius.

4. The gear box of claim 1, wherein the ring assembly includes a split ring with an inner surface having a profile substantially similar to a profile of the retaining surface.

5. The gear box of claim 4, wherein the inner surface includes a ring conical surface, a ring curved surface, and a ring transition surface, and wherein the ring conical surface engages the conical surface of the retaining surface to guide the split ring into engagement with the retaining surface.

6. The gear box of claim 4, wherein the split ring is axially secured by engagement of the inner surface and the retaining surface.

7. The gear box of claim 4, wherein when the split ring is engaged with the retaining surface, a bottom edge of the split ring abuts the bearing to prevent axial movement of the bearing.

8. The gear box of claim 1, wherein the shaft includes a shoulder, and wherein the bearing is positioned on the shaft between the shoulder and the recess.

9. The gear box of claim 1, wherein the conical surface is angled with the conical surface facing partially axially downwardly toward the bearing such that when the shaft is subject to a bending load, the bearing may apply an axial upward force on the ring assembly which is reacted through a corresponding axial downward force due to engagement of the ring assembly and the conical surface.

10. A bearing retention system for a gear box, the gear box including a housing and a shaft at least partially positioned within the housing of the gear box, the system comprising:
a bearing mounted between the shaft and the housing to support the shaft for rotation relative to the housing about a rotation axis, the bearing adjacent a shoulder formed in the shaft and including,
an inner race surrounding the shaft,
an outer race coupled to the housing, and
a plurality of rollers positioned between the inner race and the outer race to allow rotation of the outer race with respect to the inner race;
a split ring surrounding the shaft, wherein the split ring is selectively engageable within a recess formed in the shaft, wherein the recess and the shoulder are on axially opposite sides of the bearing, the recess having a retaining surface including a conical surface, a transition surface, and a curved surface; and
a locking ring surrounding the split ring and biasing the split ring into the recess;
wherein the bearing is axially secured with respect to the shaft between the shoulder and the recess, and
wherein the transition surface is parallel to the rotation axis and is smaller than the curved surface.

11. The bearing retention system of claim 10, wherein the locking ring is coupled to the split ring using fasteners extending radially through the locking ring to couple to the split ring.

12. The bearing retention system of claim 10, wherein the locking ring is coupled to the split ring via a detent and indent.

13. The bearing retention system of claim 10, wherein the bearing further includes a spacer sleeve positioned on the shaft between the inner race and the split ring.

14. The bearing retention system of claim 10, wherein the outer race of the bearing is supported adjacent a ledge formed in the housing of the gear box to support the bearing in the housing.

15. An aircraft comprising:
a main body extending between a nose and a tail;
a shaft extending between a first end and a second end along an axis, the shaft having a shoulder and a recess including a retaining surface with a conical surface, a transition surface, and a curved surface;
a rotor assembly mounted on the first end of the shaft;
a gear box configured to drive the shaft to rotate the rotor assembly, the gear box including a housing;
a bearing mounted between the shaft and the housing to support the shaft for rotation with respect to the housing about the axis, the bearing resting against the shoulder; and
a ring assembly for axially securing the bearing to the shaft, the ring assembly including, a split ring at least partially seated within the recess, and a locking ring surrounding the split ring to bias the split ring into the recess wherein the conical surface extends at an angle to the axis and the transition surface extends parallel to the axis, and the conical surface is larger than the transition surface.

16. The aircraft of claim 15, wherein the bearing is prevented from axial displacement in a first direction by the shoulder and in a second direction by the ring assembly.

* * * * *